3,582,498
METHOD OF PRODUCING SOLVENT SOLUBLE FUSIBLE POLYPHENYLENE POLYMERS
Norman Bilow and John B. Rust, Los Angeles, Calif., assignors to Hughes Aircraft Company, Culver City, Calif.
No Drawing. Filed Sept. 5, 1967, Ser. No. 665,266
Int. Cl. C08g 33/00
U.S. Cl. 260—2                                        5 Claims

ABSTRACT OF THE DISCLOSURE

The method of producing soluble and fusible polyphenylene polymers, curable to insoluble and infusible heat resistant aromatic resins, by polymerization of fused ring and non-fused ring aromatic compounds selected from the group consisting of anthracene, naphthalene, phenanthrene, biphenyl, terphenyl, quaterphenyl, isomers thereof, and mixtures of same, and mixtures of the same with other aromatic compounds with not more than and preferably less than five aromatic rings in a nitroalkane solvent for the monomers, catalyst and polymers.

---

The invention herein described was made in the course of or under a contract or subcontract thereunder, with the Department of the Navy.

This invention relates to an improvement in the method of producing useful, soluble, and fusible polyphenylene polymers from naphthalene, anthracene, phenanthrene, biphenyl, terphenyl, quaterphenyls, and isomers, and mixtures thereof, and mixtures of these monomer compounds with other aromatic material as benzene, phenylene oligomers and polyphenylenes with not more than 5 aromatic rings, in a volatile nitroalkane solvent. More particularly, the invention concerns the discovery of the advantageous use of a volatile mononitroalkane solvent to more efficiently reduce the polyphenylene polymers viscosity as they are formed without deleteriously affecting the yield of such polymers.

In conjunction herewith, reference is made to our filed related application matters of assignee, Hughes Aircraft Company, entitled "Commercially Useful Polyphenylene Polymer and Method of Production Thereof," Ser. No. 665,262, and "Method of Providing Useful Heat-Setting Aromatic Polymer Resinous Compositions and Products," Ser. No. 665,578, and publication Bilow et al., "Jour. Macromol. Science (Chem.)," vol. A1(1), Mar. 29, 1967, pp. 183–197. These applications pertain to the commercial production and commercial usefulness of soluble and fusible polymers of biphenyl, terphenyl, quaterphenyl compounds, including isomers thereof, mixtures of the same, and mixtures of the same with other phenylene oligomers, and polyphenyls with not more than, and preferably less than, 5 aromatic rings. The polymers, being prepared by the catalytic and oxidative process in the applications as therein disclosed.

Phenylene polymers have been disclosed in the art as being prepared by other starting raw materials. With exception of the above, such polymers have, in every case, been entirely unsuitable for the purpose of making protective coatings, laminated, or molded structures having high thermal stability. Apparently, the reason for this unsuitability is that the prior art polyphenylene polymers, or resins, have been substantially infusible or insoluble in organic solvents. Those few prior art polyphenylene polymers which were fusible and soluble owed their fusibility to the presence of aliphatic groups formed during the course of polymerization and the reduced polymers thus had carbon:hydrogen atomic ratios of significantly less than 1.4:1. A fully aromatic polyphenylene should have a carbon:hydrogen atomic ratio of about 1.5:1 or within a range of over 1.4:1 to 1.7:1, Due to the aliphatic groups in the polymers of the prior art, they never possessed the thermal stability of a fully aromatic polyphenylene. Reduced polyphenylenes which are partially aliphatic in character, for example, are always obtained when the polymers are prepared by Wurtz-Fitting reactions of halo-aromatics with alkali metals. It is, therefore, very important that the branched polyphenylene resins of the present invention be produced by a catalytic and oxidative polymerization of aromatic hydrocarbons in the solvent material as herein described.

When the branched fully aromatic polyphenylene resins are produced by polymerizing the aromatic hydrocarbon raw materials in the presence of, say, aluminum trichloride and cupric chloride by heating the reactants to elevated temperatures, the reaction mixture can become very viscous. In some cases, the viscosity of the melt is substantially infinite and in other cases, it can be as low as 100,000 to 150,000 centipoises, for instance. However, a means of lowering the viscosity still further would be highly desirable. In order to do this, many solvents were tried but none could be found which had the required combination of properties; to wit: (a) reduce the reaction mixture viscosity to a condition of high fluidity, (b) did not deleteriously affect the yield of usable polymer, (c) was stable to and unaffected by the strong Lewis acid, (d) was resistant to degradation by the strong oxidant, (e) did not react and become part of the polymer product thus degrading the properties of the branched, fully aromatic polyphenylene resin, and (f) are sufficiently volatile so that they can easily be removed at the end of the reaction. We have now, however, found a class of solvents which uniquely fulfills the above requirements. This class of solvents constitutes the volatile nitroalkanes and particularly mononitroalkanes. These solvents are discovered to be reasonably volatile, inert, and non-reactive compounds which are excellent solvents for both the Lewis acid catalyst and the aromatic hydrocarbon raw materials upon initial mixing and more especially solvents for the polymers as they are formed during polymerization.

For many applications in the art of coating, molding, and fabricating structures having high thermal stability, it is essential to use a high-temperature-stable polymer which has an intrinsically high molecular weight or which may be crosslinked, cured, vulcanized, and the like, to produce a high molecular weight (or an infinite molecular weight) during the said molding and fabrication process. At the same time, it is essential that the polymer be fusible or capable of flow under the conditions of heat and pressure that are used in the said molding and fabrication process and that the uncured polymer be soluble in suitable solvents so that fillers, fiber reinforcements and the like can be intimately coated with the polymer prior to the said molding and fabrication process. The exceptional characteristics of the polyphenylene polymers of the present invention may be described in terms of four outstanding properties:

(1) They have excellent thermal stability exhibiting in the cured state negligible weight loss between 400–500° C. in an inert atmosphere.

(2) They have mean molecular weights which range on the order of from 1000±500 up to 4000, or more.

(3) They are sufficiently soluble in organic solvents, as chloroform, halobenzenes, and tetrachloroethane, especially when hot to permit their use in lacquers and varnishes.

(4) They are fusible and flow sufficiently at temperatures that are conventionally employed in hot molding presses to permit their fabrication in conventionally available equipment.

This unique combination of properties, coupled with their ease of preparation in good yield by the process of the present invention, constitutes a significant and major advance in the state of the art of fully aromatic polyphenylene resins. This unique combination of properties is the direct result of the proper choice of reactants and of the proper choice and use of the catalyst and oxidant in the process of the present invention. In our copending disclosure, entitled, "Method of Providing Useful Heat-Setting Aromatic Polymer Resinous Compositions and Products," Ser. No. 665,578, included by reference thereto, are described unique composite resin combinations and compositions which utilized the polyphenylene polymers of the present invention as curable solution or vulcanizable compositions which can be fabricated into useful molded and laminated structures. Structures produced in this matter, include: electrical insulators, temperature resistant nozzles, and structural materials which are required to withstand high temperatures, or substantially high temperatures for long periods of time.

Accordingly, it is an important object of this invention to provide an improved method for producing polyphenylene polymers which are resistant to high temperatures, are soluble in suitable solvents and which are fusible and useful in molding and laminating compositions.

It is another object of this invention to provide fusible, soluble and high-temperature-stable branched polyphenylene polymers having utility for various purposes such as coating, molding, and laminating compositions.

Additional objects will become apparent from the following descriptions which are given primarily for purposes of illustration and are not to be construed as in any way limiting the spirit and scope of this invention. In the process of the present invention, the aromatic reactants may be anthracene, naphthalene, phenanthrene, biphenyl, terphenyl, quaterphenyl, and isomers and mixtures of these compounds, including mixtures of the same with other phenylene oligomers and polyphenyls with not more than five aromatic rings. In the case of biphenyl, this exists as only a single compound. In the case of terphenyl, there are three isomers which can be employed in the process of this invention with the para terphenyl isomer being the least desirable. In the case of quaterphenyl, there are nine isomers which are suitable for this invention with the all para quaterphenyl isomer being least desirable. Any single monomer compound or isomer, as indicated, is satisfactory for producing the polyphenylene polymers of this invention and any mixture of such compounds and isomers are also suitable. However, some compounds and isomers or mixtures of compounds and isomers, are more convenient than others. The relative convenience is dictated by such considerations as yield of fusible polymer, cost, solubility, melting point, and ease of processing during the course of the polymerization reaction.

The preferred monomer materials which form the polyphenylene polymers are more particularly biphenyl, ortho- and meta-terphenyls, the 2, 2′-, 3, 3′-, 2,3′-, 2,4′-, 3,4′-, diphenyl biphenyls, the 1,2,3-, 1,2,4-, and 1,3,5-triphenylbenzenes, mixtures thereof, and mixtures thereof with other aromatic monomers or polymers as phenylene oligomers and polyphenyls with not more than five aromatic rings. Less preferably, but, if desired, a small amount of such aromatic monomer, oligomer or polymer material as benzene in an amount no greater than up to about ⅓ by weight may be used with the above. If too much benzene is used, an intractable material is obtained. The para monomer is not adaptable to being polymerized above for producing the desirable fusible and tractable polyphenylene polymers, but less preferably may be present in trace to limited amounts in the monomer mixture, or present in a polymer mixture with the above polymerized monomers, as a combination mixture, with retention of the desirable polymers in predominately tractable, fusible and curable form.

The catalyst and oxidant combination employed in the process of the present invention is very critical. As the catalyst, we use a strong Lewis acid. The strong Lewis acid compound is an actual catalyst; that is, it may be employed in amounts less than the stoichiometry which the reaction calls for. However, the use of greater than catalytic quantities is not precluded and can even be highly desirable. The Lewis acid catalyst must be one that is classed as a strong Lewis acid. As the strength of the Lewis acid falls off from the strongest available, then the reaction rate of the process of the present invention falls off sharply.

A preferred Lewis acid catalyst is an anhydrous metal halide, as aluminum chloride. However, less preferably, other strong Lewis acid catalysts such as substantially anhydrous ferric chloride, aluminum bromide, aluminum iodide, and mixtures of the same, and mixtures of the same with aluminum chloride may be used. Less preferably, other catalysts as substantially anhydrous tantalum pentachloride, antimony pentachloride, gallium tribromide, zirconium tetrachloride, mixtures of the same, including mixtures thereof and one or more in mixture with the preferred aluminum halide, may be used. The oxidant employed in the process of the present invention is consumed in stoichiometric quantities because it is essentially a reactant which oxidizes the partially aliphatic polymer which is formed initially to a fully aromatic polymer. Therefore, at least that molar equivalent quantity necessary to fully aromatize the polymer is required to be present as a reactant during the reaction. For each mole of aromatic compound consumed in the reaction, there is normally required two equivalents of the oxidant because for each mole of aromatic compound reactant that reacts, two electrons must be removed, thus reducing two molar equivalents of the oxidant. One of the most efficient oxidants for this process is cupric chloride. In using this oxidant, hydrogen chloride is evolved as a by-product and the cupric chloride is primarily reduced to cuprous chloride which is inactive as an oxidant. Other less preferred halide salts of copper (ic) may also be employed as well as cupric sulfate and combinations of oxidant material, including ferric chloride, and mixtures of the same with cupric chloride. Because copper is a relatively expensive commodity and because the oxidant must be used in substantially large amounts in the process, ferric chloride was used as both the Lewis acid catalyst and as the oxidant. However, ferric chloride gave relatively poorer yields of the fully aromatic, branched polyphenylene resins. In conjunction with the use of the solid oxidant or, for example, catalyst and oxidant, as cupric chloride, there may be used a flow of air or oxygen into the reaction mix which is believed to reconvert the cuprous ion to the cupric ion.

Nitroalkanes can be obtained as low boiling, inert and nonreactive compounds and are excellent solvents for both the Lewis acid catalyst, the aromatic hydrocarbon raw materials and for the polymer as it is being formed during polymerization.

Furthermore, it has been surprisingly found that contrary to expectations, the yield of usable polymer is actually increased by using the mononitroalkane solvent over that yield which could normally be expected in the absence of solvent. As the mononitroalkane solvent, we may use nitromethane, nitroethane, 1-nitropropane, 2-nitropropane, 1-nitrobutane, 2-nitrobutane, 1-nitroisobutate, 2-nitroisobutane, mixtures of the same, and the like. Although we prefer to employ the relatively low boiling mononitroalkanes, the higher boiling nitroalkane compounds may also be used provided they are, at least, steam volatile, so that they can be substantially removed from the reaction mixture subsequent to completion of the reaction. The proportion of the mononitroalkane solvent can be varied over wide ranges depending upon the type of reaction condition that is desired. Thus, we may use less than 10% of mononitroalkane solvent which serves to reduce the viscosity of the reaction mixture to an adequately fluid state or we may employ over 200% of mononitroalkane solvent based on the total of the other ingredients so that all ingredients except the oxidant will be in solution in the mononitroalkane and a substantially completely homogeneous reaction can take place.

The following examples are given to illustrate the process of the present invention, the manner in which it is to be performed and the products that results therefrom:

EXAMPLE 1

Into a 1-liter resin kettle fitted with a glass mantle heater, high torque stirrer and reflux condenser were added biphenyl (77 g., 0.5 mole), m-terphenyl (115 g., 0.5 mole) and nitromethane (275 ml.). The contents were heated to effect solution and then anhydrous aluminum trichloride (135 g., 1.0 mole) was added while the mixture was agitated rapidly. During the early addition, a small amount of $NO_2$ was noted which soon disappeared. After the addition of the aluminum trichloride, the mixture was stirred for about thirty minutes and freshly prepared anhydrous pulverized cupric chloride (269 g., 2.0 moles) was added in small portions over a twenty-minute period while the reaction mixture was kept at a gentle reflux rate. After the addition of the cupric chloride, the mixture stirred for five hours while being kept at a gentle reflux. During this time, there was a steady evolution of hydrogen chloride gas. The viscosity of the reaction mixture was sufficiently low to permit easy stirring. After hydrogen chloride evolution ceased, the catalyst was destroyed by addition of 100 ml. of water and the water and solvent were removed by the application of heat with a steam bath and a water aspirator as the vacuum source. After this treatment, the polymeric material which had the consistency of soft asphalt was given a preliminary wash with hot concentrated hydrochloric acid and water. The product was dried by driving off the water on a hot plate and then given a wash with naphtha which removed 16.1 g. unreacted monomers (8.3% of starting materials); after vacuum drying the polymer was again washed with concentrated hydrochloric acid, then dilute hydrochloric acid and finally with water. The result was 202 g. of polymer. This quantity of material indicates that there possibly were still occluded inorganic salts. Extraction of this product with 5% by volume benzene in naphtha yielded 16.1% low molecular weight soluble material. Subsequent extraction of the insoluble portion with chlorobenzene yielded 54.6 g. of soluble polymer based on the original crude polymer. Taking into account the recovered unreacted monomer, the chlorobenzene soluble polymer was obtained in 62.6% yield based on monomers consumed.

EXAMPLE 2

Into a 1-liter resin kettle fitted with a glass mantle heater, high torque stirrer and reflux condenser were added biphenyl (77 g., 0.5 mole), m-terphenyl (115 g., 0.5 mole) and nitroethane (275 ml.). The contents were heated to effect solution and then anhydrous aluminum trichloride (135 g., 1.0 mole) was added while the mixture was agitated rapidly. During the early addition, a small amount of $NO_2$ was noted which soon disappeared. After the addition of the aluminum trichloride, the mixture was stirred for about thirty minutes and freshly prepared anhydrous pulverized cupric chloride (269 g., 2.0 moles) was added in small portions over a twenty-minute period while the reaction mixture was kept at a gentle reflux rate. After the addition of the cupric chloride, the mixture stirred for several hours while being heated under gentle reflux. During this time, there was a steady evolution of hydrogen chloride gas. The viscosity of the reaction mixture was sufficiently low to permit easy stirring. After hydrogen chloride evolution virtually ceased, the catalyst was destroyed by addition of 100 ml. of water and the water and solvent were removed by the application of heat using a steam bath and a water aspirator as the vacuum source. After this treatment, the polymeric material which had the consistency of soft asphalt was given a thorough wash with hot concentrated hydrochloric acid and water. The product was dried in a vacuum oven and then given a wash with naphtha which removed unreacted monomers; after vacuum drying again, the polymer was washed again with concentrated hydrochloric acid, then water. Extraction of this dried product with 10% by volume benzene in naphtha removed the excessively low molecular weight soluble material. Extraction of the remaining insoluble portion with chlorobenzene yielded over 50 g. of soluble polymer.

EXAMPLE 3

Into a 1-liter resin kettle fitted with a glass mantle heater, high torque stirrer and reflux condenser was added, m-terphenyl (230 g., 1.0 mole) and nitropropane (275 ml.). The contents were heated to effect solution and then anhydrous aluminum trichloride (135 g., 1.0 mole) was added while the mixture was agitated rapidly. During the early addition, a small amount of $NO_2$ was noted which soon disappeared. After the addition of the aluminum trichloride, the mixture was stirred for about thirty minutes and freshly prepared anhydrous pulverized cupric chloride (269 g., 2.0 moles) was added in small portions over a thirty-minute period while the reaction mixture was kept at a gentle reflux rate. After the addition of the cupric chloride, the mixture stirred for five hours while being kept at a gentle reflux. During this time, there was a steady evolution of hydrogen chloride gas. The viscosity of the reaction mixture was sufficiently low to permit easy stirring. After hydrogen chloride evolution ceased, the catalyst was destroyed by addition of 100 ml. of water and the water and solvent were removed by the application of heat using a steam bath and a water aspirator as the vacuum source. After this treatment, the polymeric material which had the consistency of soft asphalt was thoroughly washed with hot concentrated hydrochloric acid and water. The product was dried by driving off the water in a vacuum oven and then given a wash with naphtha which removed monomers and much of the nitropropane; after vacuum drying again the polymer was again thoroughly washed with concentrated hydrochloric acid, then dilute hydrochloric acid and finally with water. Extraction of this product with 15% by volume benzene in naphtha removed the excessively low molecular weight soluble material. Extraction of the remaining insoluble portion with chlorobenzene yielded about 60 g. of soluble polymer.

EXAMPLE 4

Into a one-liter resin flask fitted with a high torque stirrer, reflux condenser, oil bath, and gas outlet tube were added 275 ml. of nitromethane. Then anhydrous aluminum trichloride (269 grams, 2.00 moles) was added to the nitromethane while stirring vigorously. The resulting suspension was grayish-white in color. An equi-molar molten mixture of biphenyl (77 grams, 0.50 mole) and meta-terphenyl (115 grams, 0.50 mole) was then added to the resin flask while the nitromethane was kept just below reflux temperature. To the reaction mixture was added anhydrous cupric chloride (2.00 moles, 269 g.) in small portions. The mixture was kept at reflux temperature for a total of 2½ hours. A small quantity of the reaction mixture was lost due to foaming (less than 5%).

Then, approximately 50 ml. of water was added dropwise to deactivate the aluminum trichloride catalyst.

In order to remove solvent, the reaction product was placed in a large Petri dish and heated to 120° C. under vacuum. The crude product was washed free of inorganic salts by digesting in boiling hydrochloric acid, filtering and washing free of acid with water. After drying in the oven, 157 grams of crude polymer was obtained. Using a Soxhlet extraction technique, the following results were obtained for the crude resin:

| | Percent |
|---|---|
| 10% benzene-90% naphtha soluble products | 8 |
| Chlorobenzene soluble polymer fraction | 49 |
| Chlorobenzene insoluble polymer fraction | 43 |

EXAMPLE 5

Into a 1-liter resin kettle fitted with a glass mantle heater, high torque stirrer and reflux condenser were added naphthalene (64 g., 0.5 mole), m-terphenyl (115 g., 0.5 mole) and nitromethane (275 ml.). The contents were heated to effect solution and then anhydrous aluminum trichloride (135 g., 1.0 mole) was added while the mixture was agitated rapidly. During the early addition, a small amount of $NO_2$ was noted which soon disappeared. After the addition of the aluminum trichloride, the mixture was stirred for about thirty minutes and freshly prepared anhydrous pulverized cupric chloride (269 g., 2.0 moles) was added in small portions over a twenty-minute period while the reaction mixture was kept at a gentle reflux rate. After the addition of the cupric chloride, the mixture was stirred for five hours while being kept at a gentle reflux. During this time, there was a steady evolution of hydrogen chloride gas. The viscosity of the reaction mixture was sufficiently low to permit stirring. After hydrogen chloride evolution ceased, the catalyst was destroyed by addition of 100 ml. of water and the water and solvent were removed by the application of heat with a steam bath and a water aspirator as the vacuum source. After this treatment, the polymeric material which had the consistency of asphalt was given a preliminary wash with hot concentrated hydrochloric acid and water. The product was dried driving off the water on a hot plate and then given a wash with naphtha which removed unreacted monomers; after vacuum drying the polymer was again washed with concentrated hydrochloric acid, then dilute hydrochloric acid and finally with water. The yield was 130 g. of polymer. Extraction of this product with 5% volume benzene in naphtha removed low molecular weight soluble material. Extraction of the insoluble portion with chlorobenzene yielded 50 g. of soluble polymer based on the original crude polymer. Taking into account the recovered unreacted monomer, the chlorobenzene soluble polymer was obtained in about 39% yield based on monomers consumed.

As it will now be known and recognized by those skilled in the art, the herein indicated and described components may be mixed and reacted in the manner described in the solvent material provided to effect the production of soluble and fusible aromatic fused and nonfused ring aromatic polymers useful in the production of unmodified and modified aromatic resins.

The polyphenylene polymers obtained are curable with a curing agent as aromatic polymethylol compounds and acid catalyst system, as xylylene glycol and p-toluenesulfonic acid, preferably in prepolymer form, and the like, as disclosed in the herewith filed application entitled, "Aromatic Resinous Curing System and Method," Ser. No. 665,303, of Norman Bilow and Leroy J. Miller, and also such curing agents as aromatic polysulfonic acids as disclosed in our herewith co-filed application, "Method of Producing New Aromatic Resins and Products Thereof," Ser. No. 665,269, included herein by reference thereto.

In addition, modified mixtures of the monomer or polymer material as described and embodied herein may be prepared by inclusion therewith of other aromatic monomer or polymer material as toluene, xylylene, coumarone, indene, coumarone-indene, polyphenylene oxide, polyphenylene sulfide, polystyrene, pitch plastic, and mixtures thereof in a proportion of from trace amounts up to over 50% dependent upon the end results desired as to modification thereof or modification of the fused or unfused aromatic ring material provided herein. Further, the products of the above mixtures can be used with inert material or synthetic filler material, impregnated or mixed therewith in liquid or solid state.

Having described and illustrated the present embodiment of this improvement in the art in accordance with the patent statutes, it will be apparent that some modification and variation may be made without departing from the spirit and scope thereof. The specific embodiments described are given by way of examples illustrative of the improvement discovered applicable herein.

What is claimed is:

1. A method of producing soluble and fusible polyphenylene polymers comprising the steps of:
   (1) forming a stirrable mixture of:
      (a) aromatic monomer material selected from the group consisting of non-para isomers of terphenyl and quaterphenyl, biphenyl, anthracene, naphthalene, phenanthrene, mixtures thereof and mixtures with other aromatic monomers containing not more than five aromatic rings;
      (b) a polymerization effecting combination of an anhydrous strong Lewis acid and an anhydrous solid oxidant selected from the group consisting of cupric chloride, cupric bromide, cupric sulfate, ferric chloride, and mixtures of the same; and
      (c) a volatile mononitroalkane solvent for said catalyst, oxidant, monomer and polymer;
   (2) heating and stirring said mixture for a period of time measured by the termination of evolution of hydrogen chloride gas to form said polymer;
   (3) removing said solvent and combination from said mixture; and
   (4) recovering a fusible, polyphenylene soluble in hot chlorobenzene.

2. The method of claim 1 wherein the Lewis acid catalyst is selected from the group consisting of aluminum chloride, aluminum bromide, aluminum iodide, boron trifluoride, gallium tribromide, zirconium tetrachloride, ferric chloride, tantalum pentachloride, and antimony pentachloride, and mixtures of the same.

3. A method according to claim 1 further including the step of flowing oxygen gas into said heated mixture.

4. The method of claim 1 wherein the nitroalkane solvent is selected from the group consisting of nitromethane, nitroethane, 1-nitropropane, 2-nitropropane, 1-nitrobutane, 2-nitrobutane, 1-nitroisobutane, 2-nitroisobutane, and mixtures of the same.

5. A method according to claim 4 in which said monomer material is selected from the group consisting of biphenyl, ortho-terphenyl, meta-terphenyl, 2,2'-, 3,3'-, 2,3'-, 2,4'-, 3,4'-, diphenyl-biphenyl, 1,2,3-, 1,2,4- and 1,3,5-triphenylbenzene, mixtures thereof and mixtures with other aromatic monomers containing not more than 5 aromatic rings.

References Cited

UNITED STATES PATENTS

| | | | |
|---|---|---|---|
| 3,145,237 | 8/1964 | Van Helden et al. | 260—670 |
| 3,159,589 | 12/1964 | Bloomfield et al. | 260—2 |
| 3,431,221 | 3/1969 | Hoess | 260—2 |
| 3,437,644 | 4/1969 | Neuse et al. | 260—2 |

FOREIGN PATENTS

| | | | |
|---|---|---|---|
| 1,000,679 | 8/1965 | Great Britain | 260—2 |

(Other references on following page)

OTHER REFERENCES

Badische Anilin and Soda Fabrik, Netherlands application 6404921, printed November 1964.

Borg-Warner Corp., Netherlands application 6609825, printed January 1967 (67 Chem. Abstracts 11979k).

Berlin et al., 67 Chem. Abstracts 82422j (1967).

Bilow et al., "Jour. Macromol. Science (Chem.)," vol. A1(1), Mar. 29, 1967, pp. 183–197.

Kovacic et al., "Jour. Organic Chem.," vol. 29, August 1964, pp. 2416–2420.

SAMUEL H. BLECH, Primary Examiner

U.S. Cl. X.R.

117—161; 161—182; 252—441, 442; 260—28, 32.4, 33.6, 33.8, 79.3, 823, 829, 874